(12) United States Patent
Fukui

(10) Patent No.: US 11,448,624 B2
(45) Date of Patent: Sep. 20, 2022

(54) IONIZATION PROBE CONNECTION JIG, LIQUID CHROMATOGRAPH, AND LIQUID CHROMATOGRAPH MASS SPECTROMETER

(71) Applicant: SHIMADZU CORPORATION, Kyoto (JP)

(72) Inventor: Wataru Fukui, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 490 days.

(21) Appl. No.: 16/612,949

(22) PCT Filed: Sep. 14, 2017

(86) PCT No.: PCT/JP2017/033294
§ 371 (c)(1),
(2) Date: Nov. 12, 2019

(87) PCT Pub. No.: WO2019/053847
PCT Pub. Date: Mar. 21, 2019

(65) Prior Publication Data
US 2020/0158703 A1    May 21, 2020

(51) Int. Cl.
*G01N 30/72*    (2006.01)
(52) U.S. Cl.
CPC ..... *G01N 30/7266* (2013.01); *G01N 30/7206* (2013.01); *G01N 30/7233* (2013.01)
(58) Field of Classification Search
CPC ........... G01N 30/7266; G01N 30/7206; G01N 30/7233; G01N 27/62; H01J 49/10
(Continued)

(56) References Cited

U.S. PATENT DOCUMENTS

| | | | |
|---|---|---|---|
| 5,358,641 A * | 10/1994 | Sanford | G01N 30/32 422/65 |
| 9,095,791 B2 | 8/2015 | Prentice et al. | |
| 2021/0190737 A1 * | 6/2021 | Fukui | G01N 30/7266 |

FOREIGN PATENT DOCUMENTS

JP    2008-021455 A    1/2008

OTHER PUBLICATIONS

Thermo Fisher Scientific Inc., "Thermo Scientific Dionex nanoViper Fingertight Fitting System," [online], [searched on Jul. 24, 2017], the Internet.

(Continued)

*Primary Examiner* — Kiet T Nguyen
(74) *Attorney, Agent, or Firm* — Sughrue Mion, PLLC

(57) ABSTRACT

An ionization probe connection jig used to connect an outlet-side flow path of a column 113 and an inlet-side flow path of an ionization probe 211 in a liquid chromatograph, the ionization probe connection jig includes: a first element fixture 10 fixed to a first element 113 that is one of the column 113 and the ionization probe 211; a second element fixture 20 fixed to a second element 211 that is the other; and a movement regulating tool 30 that permits the first element fixture 10 to advance in an axial direction of the first element 113 while regulating the first element 113 or the first element fixture 10 and the second element 211 or the second element fixture 20 such that flow paths of the first element 113 and the second element 211 are matched with each other, and regulates the second element fixture 20 such that the second element fixture 20 does not retreat beyond a predetermined position in a axial direction of the second element 211.

15 Claims, 10 Drawing Sheets

(58) Field of Classification Search
USPC .......................................................... 250/288
See application file for complete search history.

(56) References Cited

OTHER PUBLICATIONS

GL Sciences Inc., "Column joint format" [online], [searched on Jul. 24, 2017], the Internet.
Written Opinion of the International Searching Authority of PCT/JP2017/033294 dated Dec. 19, 2017.
International Search Report of PCT/JP2017/033294 dated Dec. 19, 2017.

* cited by examiner

BEFORE USE

AFTER ONE-TIME USE

BEFORE USE

AFTER 200-TIME USE

IONIZATION PROBE CONNECTION JIG, LIQUID CHROMATOGRAPH, AND LIQUID CHROMATOGRAPH MASS SPECTROMETER

CROSS REFERENCE TO RELATED APPLICATIONS

This application is a National Stage of International Application No. PCT/JP2017/033294 filed Sep. 14, 2017.

TECHNICAL FIELD

The present invention relates to a jig used to connect an ionization probe of an ion measurement device to a column of a liquid chromatograph and an ionization probe connected by the jig used in the liquid chromatograph that measures various components separated by the column of the liquid chromatograph by ionizing the various components, a liquid chromatograph having an ionization probe connected by the jig, and a liquid chromatograph mass spectrometer.

BACKGROUND ART

A liquid chromatograph is widely used as an apparatus that analyzes a component contained in a liquid sample. In the liquid chromatograph, the liquid sample is introduced into a column on a flow of a mobile phase, and various components contained in the liquid sample are temporally separated, and measured with a detector. The liquid chromatograph including a mass spectrometer as the detector is called a liquid chromatograph mass spectrometer. In the liquid chromatograph mass spectrometer, various components sequentially eluted from a liquid chromatograph column are ionized by introducing the various components into the ionization probe of the mass spectrometer, and the generated ions are measured in each mass-to-charge ratio.

Conventionally, the column of the liquid chromatograph and the ionization probe are connected to each other by pressing an end face on an inlet side of the ionization probe against an end face on an outlet side of the column of the liquid chromatograph fixed at a predetermined position. For example, a sleeve, a ferrule and a connection jig are used such that the sleeve has an inner diameter that gradually increases from one end toward the other end, the thread groove is formed on an inner peripheral surface of the other end of the sleeve, the ferrule is inserted into the sleeve, and the connection jig is constructed with a cylindrical push-in member in which a thread ridge corresponding to the thread groove is formed in an outer peripheral surface. The ferrule and the push-in member are attached to an end of an inlet-side flow path of the ionization probe and inserted into the sleeve, the outer peripheral thread ridge of the push-in member is screwed in the inner peripheral thread groove of the sleeve, and the ferrule is pushed into the sleeve, whereby the end face on the inlet side of the ionization probe is pressed against the end face on the outlet side of the column fixed at the predetermined position to connect the inlet side of the ionization probe and the outlet side of the column in a face abutment manner.

In recent years, a kind of liquid chromatograph mass spectrometers called nano-ESI or micro-ESI is widely used to measure a very small amount of components contained in a sample with high sensitivity. In the nano-ESI or the micro-ESI, a small-diameter column used, and the amount of eluate per unit time introduced into the ionization probe is reduced by controlling the flow rate of the mobile phase from a nL/min level to a µL/min level, which increases charging efficiency or facilitates the solvent removal. This enhances the ionization efficiency.

When the flow rate of the mobile phase is low as described above, each component separated by the column easily diffuses due to only a small space (dead volume) in the piping after the column. For example, when a dead volume exists in the flow path between the outlet of the column and the inlet of the ionization probe, component diffuses due to the dead volume. When an unskilled user connects the column and the ionization probe using the connection jig, the push-in amount of the ferrule is insufficient, and sometimes a large dead volume is generated. For this reason, there has been proposed a technique in which using a cylindrical member instead of the ferrule of the connection jig, the dead volume at the connection portion between the column and the ionization probe is reduced by increasing the push-in amount at the inlet of the ionization probe (for example, Non Patent Literature 1).

There has also been proposed a technique of integrating the column and ionization probe with the dead volume between the outlet of the column and the inlet of the ionization probe being minimized, in order to avoid the need for the user to connect the column ionization probe (for example, Patent Literature 1).

CITATION LIST

Patent Literature

Patent Literature 1: U.S. Pat. No. 9,095,791 B

Non Patent Literature

Non Patent Literature 1: Thermo Fisher Scientific Inc., "Thermo Scientific Dionex nanoViper Fingertight Fitting System", [online], [searched on Jul. 24, 2017], the Internet Non Patent Literature 2: GL Sciences Inc., "Column joint format" [online], [searched on Jul. 24, 2017], the Internet

SUMMARY OF INVENTION

Technical Problem

In the liquid chromatograph mass spectrometer of micro-ESI or the nano-ESI, a compact column oven is used to efficiently control the temperature of a small-diameter column. In order to connect the ionization probe to the column set in the compact column oven using the ionization probe connection jig described in Non Patent Literature 1, it is necessary to insert a hand into the narrow space of the column oven to screw the outer peripheral thread ridge of the push-in member in the inner peripheral thread groove of the sleeve, which results in a problem in that work efficiency is poor.

On the other hand, in the configuration described in Patent Literature 1, it is not necessary for the user to perform the operation to connect the column and the ionization probe, and therefore the above problem does not occur. However, since the column and the ionization probe are integrated, only the column cannot be removed with the disposition of the ionization probe being adjusted and the ESI probe being fixed, which results in a problem in that it takes time and effort to readjust the disposition of the ESI probe every time the column to be used is exchanged:

Although the liquid chromatograph mass spectrometer is described as an example, the same problem is also generated in a liquid chromatograph including an ion analyzer (such as an ion mobility analyzer and a classifier) except for the mass spectrometer as the detector.

A problem to be solved by the present invention is to provide an ionization probe connection jig that can easily connect the inlet-side flow path of the ionization probe that is formed separately from the column and the outlet-side flow path of the column without generating a dead volume in the liquid chromatograph including the ion analyzer as the detector.

Solution to Problem

In order to solve the above problems, according to an aspect of the present invention, an ionization probe connection jig used to connect an outlet-side flow path of a column and an inlet-side flow path of an ionization probe in a liquid chromatograph includes:

a) a first element fixture fixed to a first element that is one of the column and the ionization probe;

b) a second element fixture fixed to a second element that is the other of the column and the ionization probe; and c) a movement regulating tool configured to permit the first element fixture to advance in an axial direction of the first element and to restrict the second element fixture such that the second element fixture does not retreat beyond a predetermined position in an axial direction of the second element, while regulating the first element or the first element fixture and the second element or the second element fixture such that flow paths of the first element and the second element are aligned with each other.

When the ionization probe connection jig of the present invention is used, the first element fixture is fixed to the first element that is one of the column and the ionization probe, and the second element fixture is fixed to the second element. The both are attached to the movement regulating tool. Consequently, the flow path of the first element and the flow path of the second element are aligned. The first element fixture is permitted to advance in the axial direction (the direction in which the flow path extends) of the first element (movement in the direction toward the second element), and the second element fixture is regulated so as not to retreat (move backward from the first element) beyond a predetermined position in the axial direction of the second element. At this point, when a user applies force to advance the first element fixture, the flow path of the first element and the flow path of the second element abut on each other. The both move in the same direction (the first element advances and the second element retreats). Subsequently, when the second element fixture is retracted to the predetermined position, further movement is restricted by the movement regulating tool, and the flow path of the first element is pressed against the flow path of the second element. Consequently, the flow path of the first element and the flow path of the second element are connected to each other in a face abutment manner. In the ionization probe connection jig according to the present invention, it is only necessary to push the first element fixture toward the second element fixture, but it is not necessary to screw a narrow space of a connection point of the column and the ionization probe unlike the conventional technique, so that work efficiency is improved. The column and the ionization probe that are separately formed are used, so that only the column can be removed with the disposition of the ionization probe being adjusted and the ionization probe being fixed.

Preferably the ionization probe connection jig according to the present invention further includes d) a pressing mechanism configured to press the first element fixture so as to advance the first element fixture.

In this aspect, a force point of the pressing mechanism is disposed in a wide space in consideration of the disposition of each unit of the liquid chromatograph, which allows workability to be further improved. The pressing mechanism may directly press the first element fixture, or press the first element fixture fixed to the first element by pressing the first element (that is, indirectly press the first element fixture).

In the ionization probe connection jig according to the present invention, preferably the first element is a column, and the first element fixture is fixed to an end an outlet side end of the column.

When the first element fixture is fixed to the end on the inlet side of the column or the main body of the column, force pushing the first element fixture is transmitted to the connection portion to the ionization probe through the main body of the column. For this reason, it is necessary to carefully apply force during use of a column, such as a capillary column, which is easily damaged. On the other hand, when the first element fixture is attached to the end on the outlet side of the column, the force pushing the first element fixture is transmitted to the connection portion to the ionization probe with no use of the main body of the column, so that any careful operation is not required even if the capillary column or the like is used.

In the ionization probe connection jig of the aspect in which the first element fixture is fixed to the end on the outlet side of the column, preferably a through-hole is made at a position corresponding to a flow path of the column in the first element fixture, and the through-hole includes a tapered portion in which an inner diameter increases from a side on which the column is located toward a side on which the ionization probe is located.

In this aspect, the inlet-side piping of the ionization probe can easily be inserted into the through-hole. When the inlet-side piping of the ionization probe is inserted, the inlet-side flow path of the ionization probe is guided to a position of the outlet-side flow path of the column in the through-hole, so that the connection is precisely performed to be clear of worry about generation of liquid leakage.

In the ionization probe connection jig according to the present invention, preferably the first element fixture is detachably held on the liquid chromatograph.

Consequently, the column fixed to the first element fixture and the ionization probe connected to the column (or the ionization probe fixed to the first element fixture and the column connected to the ionization probe) are held on the liquid chromatograph, so that undesired desorption or diffusion of components in the liquid sample due to a vibration of the column the ionization probe by the vibration outside the apparatus can be prevented. The first element fixture may be fixed indirectly to the liquid chromatograph (for example, to the casing detachably attached to the liquid chromatograph).

In the ionization probe connection jig of the aspect in which the first element fixture having the through-hole is detachably held in the liquid chromatograph, preferably the first element fixture is held by the liquid chromatograph so as to be rotatable about a center axis of the through-hole.

Consequently, after the first element fixture is attached to the liquid chromatograph, the fixture can be rotated to eliminate twist of the flow path and the like connected to the inlet-side flow path of the column. In this aspect, preferably the first element fixture includes a disk-shaped portion.

Preferably the ionization probe connection jig of the aspect in which the first element fixture is held by the liquid chromatograph further includes e) an operation member detachably attached to the first element fixture. In this aspect, in performing an operation such as accommodation of the column and the first element fixture fixed to the column in the column oven, the user can select an operation member having an appropriate shape and size, and safely and easily attach the connection jig without touching a high-temperature column oven or the like.

In the ionization probe connection jig according to the present invention, preferably the pressing mechanism includes an elastic member having elasticity in the axial direction of the first element. Consequently, even if the user applies excessive force to the pressing mechanism, a part of the force is absorbed by the elasticity of the elastic member (for example, a spring), so that damage to the column and the ionization probe can be avoided. The column is manufactured by different companies, and the length of the piping protruding from the outlet of the column varies depending on the company and the type of the column. When the pressing mechanism having a configuration including the elastic member is used, the difference in the length of the piping can be absorbed and the end face on the outlet side of the column and the end face on the inlet side of the ionization probe can certainly be connected to each other in the face abutment manner.

In the ionization probe connection jig of the present invention, preferably the first element fixture is fixed to the column by a unified screw.

As described above, the column is manufactured by different companies, and the shape of the column varies depending on the manufacturing company and the type of column. However, for example, as described in Non Patent Literature 2, a connector conforming to the unified screw (inch screw) standard can be attached to many of them, so that the ionization probe connection jig can correspond to different types of columns having different shapes.

According to another aspect of the present invention, in an ionization probe connected to a column by the ionization probe connection jig, an area of an end face on an inlet side is smaller than a sectional area of a portion except for the end face. Consequently, the force required to connect the end face on the outlet side of the column and the end face on the inlet side of the ionization probe in the face abutment manner can be smaller. Thus, the force required to advance the first element fixture is decreased, and even a powerless person can easily connect the end face on the outlet side of the column d the end face on the inlet side of the ionization probe in the face abutment manner.

In the ionization probe, preferably an end on the inlet side is tapered. Consequently, the force applied to the first element fixture can be dispersed, and deformation and breakage at the end on the inlet side of the ionization probe can be prevented to improve durability.

Advantageous Effects of Invention

The use of the ionization probe connection jig of the present invention can easily connect the inlet-side flow path of the ionization probe that is formed separately from the column and the outlet-side flow path of the column without generating a dead volume in the liquid chromatograph.

DESCRIPTION OF EMBODIMENTS

Figure 1:
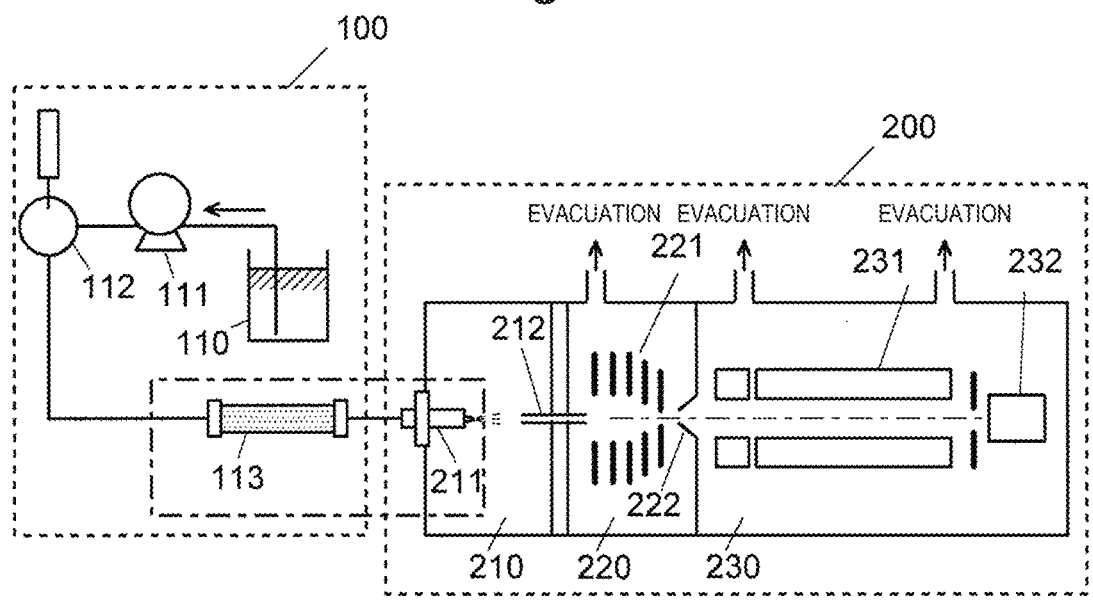
FIG. 1 is a configuration diagram illustrating a main part of a liquid chromatograph mass spectrometer in which an ionization probe connection jig according to an embodiment of the present invention is used.

An ionization probe connection jig according to an embodiment of the present invention will be described below with reference to the drawings. The ionization probe connection jig of the embodiment is used to connect an outlet-side flow path of a column and an inlet-side flow path of an ionization probe in a liquid chromatograph mass spectrometer. In the drawings used for the following description, in order to emphasize a feature portion of each component, a scale of each illustrated component varies according to a content described with reference to the drawing.

FIG. 1 illustrates a main configuration of the liquid chromatograph mass spectrometer of the embodiment.

The liquid chromatograph mass spectrometer of the embodiment roughly includes a liquid chromatograph 100 and a mass spectrometer 200, and operation of each unit is controlled by a controller (not illustrated). The liquid chromatograph 100 includes a mobile phase container 110 in which a mobile phase is stored, a pump 111 that sucks the mobile phase and delivers the mobile phase at a constant flow rate, an injector 112 that injects a predetermined amount of liquid sample into the mobile phase, and a column 113 that separates various compounds contained in the liquid sample in a time direction. An autosampler (not illustrated) that introduces a plurality of liquid samples into the injector 112 one by one is provided.

The mass spectrometer 200 has a configuration of a differential evacuation system including an ionization chamber 210 that is substantially atmospheric pressure, and an intermediate vacuum chamber 220 and a high-vacuum analysis chamber 230 which are evacuated by a vacuum pump (not illustrated). An electrospray ionization probe (ESI probe) 211 that nebulizes the sample solution while applying a charge to the sample solution is provided in the ionization chamber 210. The ionization chamber 210 and the subsequent-stage intermediate vacuum chamber 220 communicate with each other through a small-diameter heating capillary 212. An ion guide 221 that transports ions to the subsequent stage while converging the ions is provided in the intermediate vacuum chamber 220, and the intermediate vacuum chamber 220 and the analysis chamber 230 are separated from each other by a skimmer including a small hole at the top. A quadrupole mass filter 231 and an ion detector 232 are installed in the analysis chamber 230. In the embodiment, the mass spectrometer is a simple quadrupole type. However, a mass spectrometer having another configuration (such as a triple quadrupole type and an ion trap-time-of-flight type) may be used.

The mass spectrometer 200 can perform SIM (selected ion monitoring) measurement and MS scan measurement. In the SIM measurement, ions are detected while a mass-to-charge ratio of ions passing through the quadrupole mass filter 231 is fixed. In the MS scan measurement, ions are detected while the mass-to-charge ratio of ions passing through the quadrupole mass filter 231 is scanned.

The ionization probe connection jig of the embodiment is used to connect the outlet-side flow path of the column 113 and the inlet-side flow path of the ESI probe 211 in a region indicated by a one-dot chain line in FIG. 1. In the embodiment, the column 113 corresponds to the first element, and the ESI probe 211 corresponds to the second element.

The components of the ionization probe connection jig of the embodiment will be described. The ionization probe connection jig of the embodiment roughly includes an adapter 10, a probe fixture 20, a housing 30 (see FIGS. 6A and 6B), and a pressing mechanism 40 (see FIGS. 7A to 7C).

Figure 2:
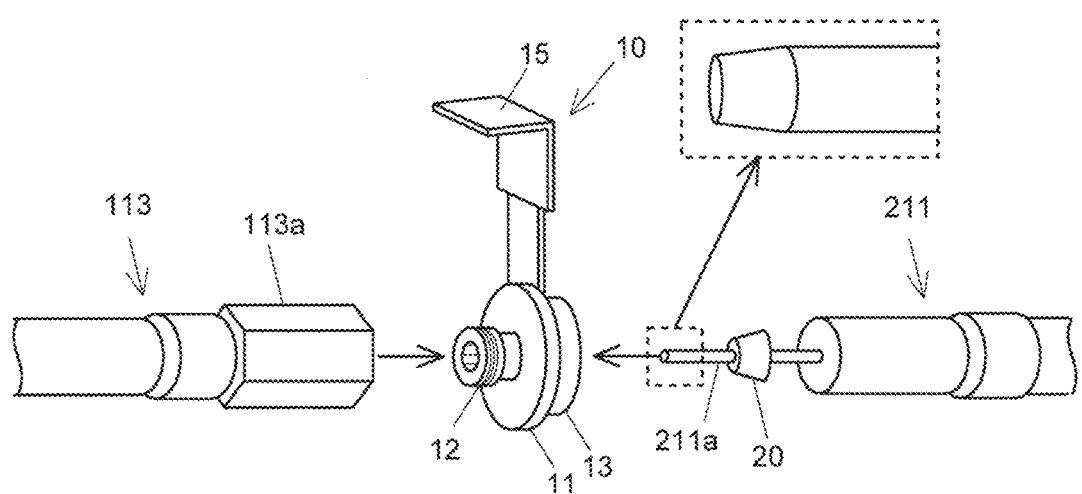
FIG. 2 is a schematic configuration diagram illustrating an adapter of the embodiment.

As illustrated in FIG. 2, the adapter 10 includes a disk-shaped flange 11, a column fixation section 12 provided on one (a surface on the side of the column 113) of surfaces of the flange 11, and a probe connection unit 13 provided on the other surface (the surface on the side of the ESI probe 211) of the flange 11. These units constitute a main body of the adapter 10.

Figure 3A:
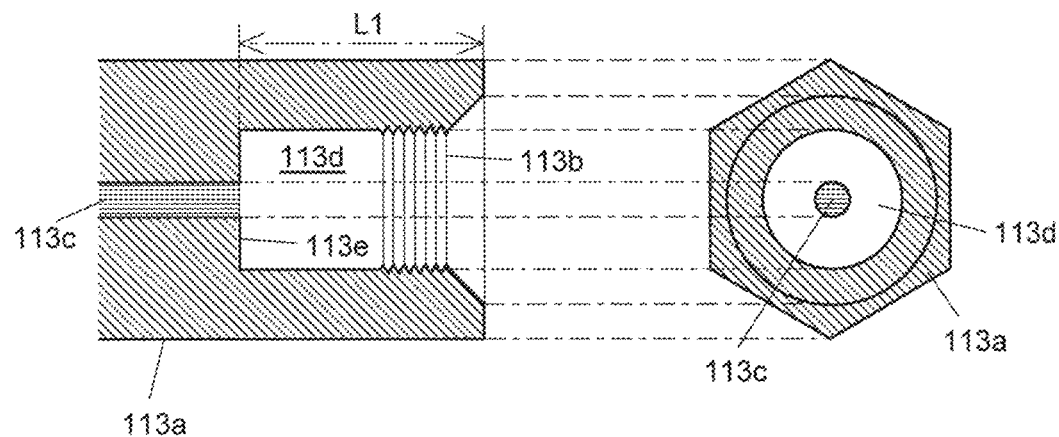
FIGS. 3A and 3B are sectional views illustrating a column connection unit of the embodiment.
Figure 3B:
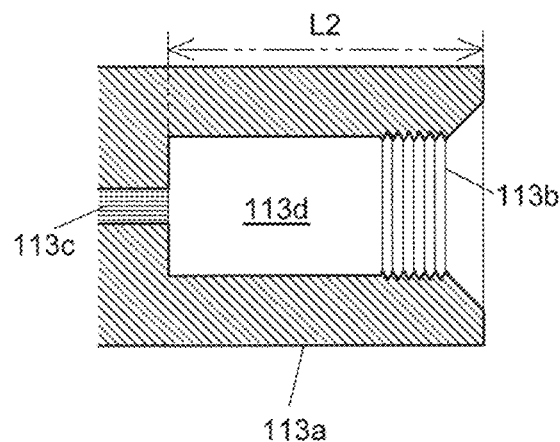

FIG. 3A illustrates a structure of a connection unit 113a of the column 113. The left of FIG. 3A is a sectional view, and the right of FIG. 3A is a view in which the connection unit 113a is viewed from the side of the ionization probe 211. An outlet-side flow path 113c of the column 113 is formed on one end side in the connection unit 113a of the column 113. A connection space 113d is provided ahead of the outlet-side flow path 113c, and a thread (female screw) 113b conforming to a unified screw standard is formed in a part of the inner peripheral surface of the connection space 113d. A surface perpendicular to a longitudinal direction (axial direction) of the column 113 at the end of the outlet-side flow path 113c of the column 113 constitutes a piping abutment surface 113e, and the piping abutment surface 113e abuts on an end face of an inlet-side piping 211a of the ionization probe 211 and is connected to the outlet-side flow path 113c of the column 113 in the face abutment manner. The shape of the connection unit 113a varies depending on the type of the column 113, and a length of the connection space 113d (L1, L2 described in FIGS. 3A and 3B) also varies. The thread 113b is common regardless of the type of the column 113. In the following description, the term "axial direction" means the longitudinal direction of the column 113. In the embodiment, because the column 113 and the ESI probe 211 are coaxially disposed, the term "axial direction" is an axial direction common to both the column 113 and the ESI probe 211. The term "coaxial" is a feature in the embodiment, and it is not always necessary that both axes be set to a common direction.

Figure 4:
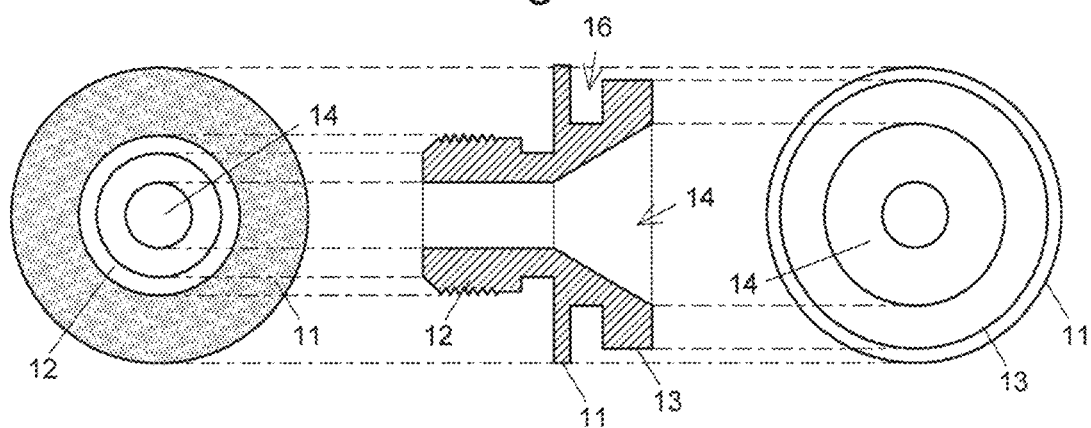
FIG. 4 is a view illustrating a configuration of a main body in the adapter of the embodiment.

A thread (male thread) corresponding to the unified screw standard (the shape of the thread 113b formed in the inner peripheral surface of the connection space 113d of the connection unit 113a of the column 113) is also provided in the outer peripheral surface of the column fixation section 12. FIG. 4 is a view illustrating the configuration of the main body of the adapter 10, the center of FIG. 4 is a sectional view, the left of FIG. 4 is a view seen from the side of the column 113, and the right of FIG. 4 is a view seen from the side of the ESI probe 211. A through-hole 14 is made in the main body of the adapter 10 so as to pierce in the axial direction (the longitudinal direction of the column 113). The through-hole 14 extends from the flange 11 to the probe connection unit 13 in a tapered shape toward the side of the ESI probe 211.

Figure 5:
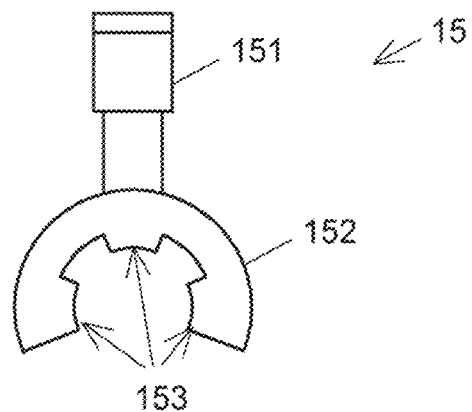
FIG. 5 is a schematic configuration diagram illustrating an operation member of the adapter of the embodiment.

As illustrated in FIG. 5 an operation member 15 is one in which a C-shaped ring 152 is formed at a leading end of an L-shaped handle 151, and protrusions 153 are provided at three points in the inner peripheral surface of the ring 152. The main body of the adapter 10 is held so as to be rotatable about the axis by inserting the three protrusions 153 of the operation member 15 into a recess 16 (see FIG. 4) between the flange 11 and the probe connection unit 13 of the adapter 10.

The probe fixture 20 is a truncated cone-shaped member in which a through-hole is made in order to insert the inlet-side piping 211a of the ESI probe 211. As illustrated in an enlarged view on the upper right of FIG. 2, the end of the inlet-side piping 211a of the ESI probe 211 is formed in a tapered shape, and the probe fixture 20 is attached to the inlet-side piping 211a.

Figure 6A:
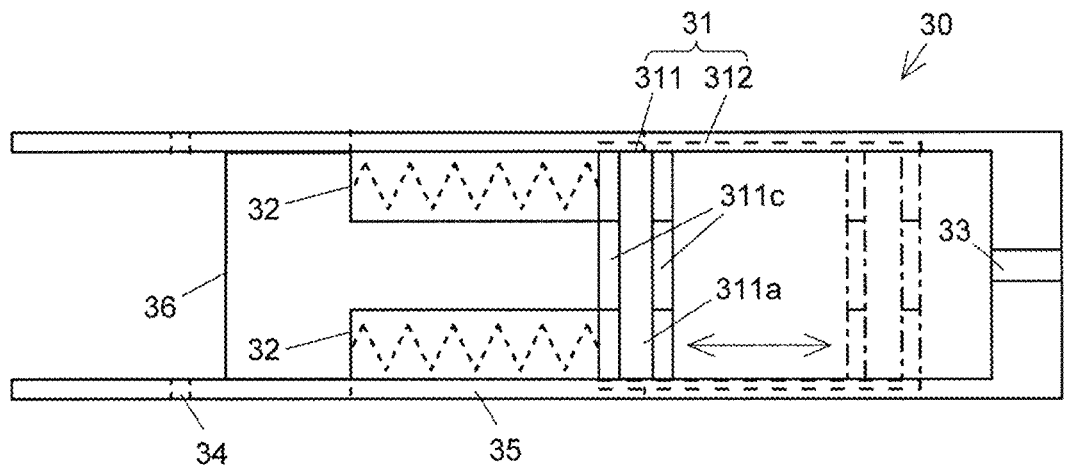
FIGS. 6A and 6B are schematic configuration diagrams illustrating a casing of the embodiment.
Figure 6B:
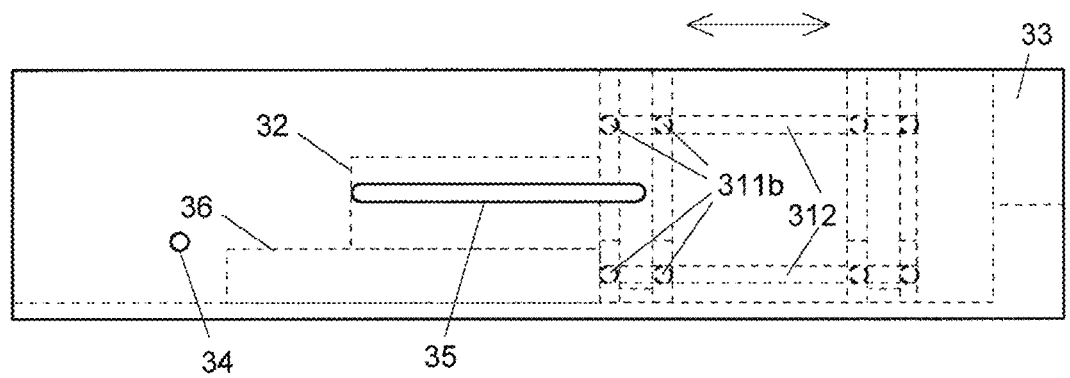

FIG. 6A is a schematic diagram illustrating the housing 30 as seen from above, and FIG. 6B is a schematic diagram illustrating the housing 30 as seen from the side. The housing 30 is a rectangular parallelepiped casing including an open top surface and an open surface on the side in which the column 113 is inserted, and is accommodated in a column oven of the liquid chromatograph 100. An adapter attaching unit 31, a pressing mechanism accommodating unit 32, and a column mounting unit 36 are provided in the housing 30.

The adapter attaching unit 31 includes an adapter accommodating unit 311 including a protrusion 311b in an outer surface in which a slot 311a having a shape corresponding to an outer shape of the flange 11 of the adapter 10 is formed and an adapter accommodating unit holder 312 that has a rail into which the protrusion 311b is inserted and movably holds the adapter accommodating unit 311 between a position indicated by a solid line in FIG. 6A and a position indicated by an alternate long and short dash line in FIG. 6A. A recess 311c in which the top is open is formed in two sidewalk located on both sides of the slot 311a, the connection unit 113a of the column 113 is disposed in the recess 311c of one sidewall, and the probe connection unit 13 of the adapter 10 is disposed in the recess 311c of the other sidewall.

Two pressing mechanism accommodating unit 32 that are integrally formed with the adapter accommodating unit 311 and move in the axial direction together with the adapter accommodating unit 311 are provided on both sides of the position in which the column 113 is accommodated. Springs 44 included in two pressing mechanisms 40 (to be described later) are accommodated in the two pressing mechanism accommodating units 32.

An ionization probe accommodating unit 33 that is the recess opened upward is formed in a side surface of the housing 30 on the side to which the ESI probe 211 is attached. A size (a diameter of the section perpendicular to the axis of the hole) of the recess is slightly larger than the inlet-side piping 211a of the ESI probe 211, and therefore the inlet-side piping 211a is loosely fitted in the long hole. The size of the recess is smaller than an outer diameter of a bottom surface (the surface located on the opposite side to the column 113, the truncated cone-shaped bottom surface) of the probe fixture 20. Thus, when the ESI probe 211 to which the probe fixture 20 is attached is retracted by a predetermined distance, the probe fixture 20 (the truncated cone-shaped bottom surface) abuts on the inner wall surface around the ionization probe accommodating unit 33 of the housing 30, and the further retreat of the ESI probe 211 (the retreat beyond the predetermined position) is regulated. In the description of the embodiment, the term "advance" of the column 113 and the ESI probe 211 means movement of one side toward the other side, and the term "retreat" means movement in the opposite direction.

A circular hole 34 restricting the movement of the pressing mechanism 40 (to be described later) and a long hole 35 extending in the axial direction are made in each of two side surfaces (two side surfaces parallel to the axial direction) of the housing 30 (a total of four holes on the two side surfaces). The hole 34 is made at a position lower than the column 113, and the long hole 35 is made at the same height as the column 113. A column mounting unit 36 that supports the accommodated column 113 from below is formed in the bottom of the housing 30. A height of the column mounting unit 36 may appropriately be changed according to the size of the column 113. The adapter accommodating unit 311 and the column mounting unit 36 may be integrated.

Figure 7A:
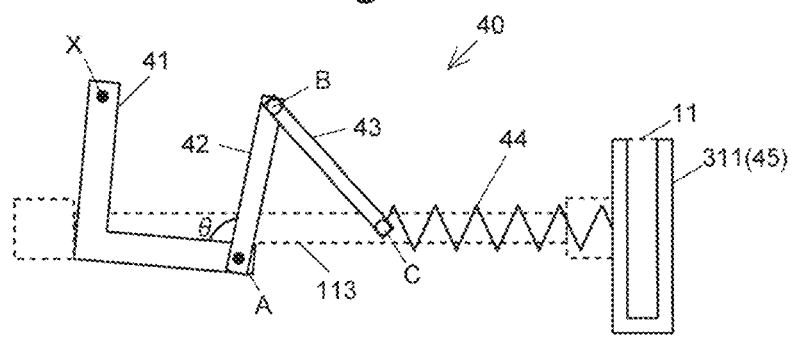
FIGS. 7A to 7C are views illustrating a configuration of the operation member of the embodiment.

FIG. 7A illustrates a schematic configuration of the pressing mechanism 40. The pressing mechanism 40 is a member accommodated in the housing 30, and is disposed on both sides of the column 113. Each of the two pressing mechanisms 40 includes an L-shaped arm 41, a rod-shaped first connection member 42 in which one end is fixed to a connection point A at the leading end of the arm 41 at an angle θ (θ>90 degrees), a rod-shaped second connection member 43 in which one end is rotatably fixed to a connection point B at the other end of the first connection member 42, a spring (elastic member) 44 connected to a connection point C at the other end of the second connection member 43, and a pressing unit 45. The pressing unit 45 of the pressing mechanism 40 is the same component as the adapter accommodating unit 311. As in another aspect (to be described later), a plate-shaped member attached to the spring 44 can be used as the pressing unit 45. That is, the arm 41, the first connection member 42, the second connection member 43, the spring 44, and the pressing unit 45 (adapter accommodating unit 311) are connected in this order. In the pressing mechanism 40, the spring 44 is connected to the adapter accommodating unit 311. Because the flange 11 of the adapter 10 is accommodated in the slot 311a of the adapter accommodating unit 311, when the adapter accommodating unit 311 is moved by the pressing mechanism 40, the adapter 10 also moves simultaneously in the same direction, and the column 113 fixed to the column fixation section 12 of the adapter 10 also moves in the same direction. The pressing mechanism 40 in FIG. 7A includes the arm 41, the first connection member 42, the second connection member 43, the spring 44, and the adapter accommodating unit 311 illustrated by solid lines in FIG. 7A. Similarly, in FIGS. 7B and 7C, members constituting the pressing mechanisms 40a, 40b are indicated by solid lines, and other members are indicated by broken lines.

Figure 7B:
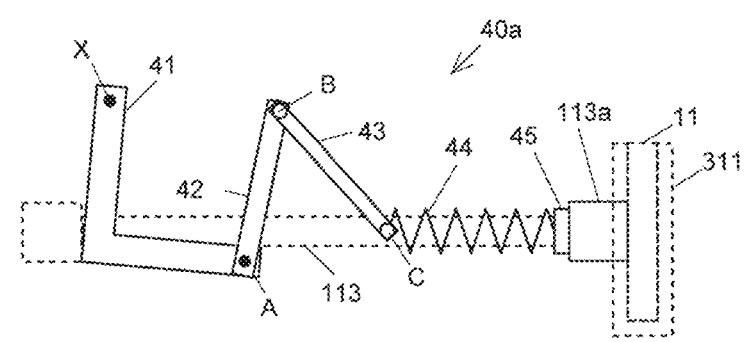
Figure 7C:
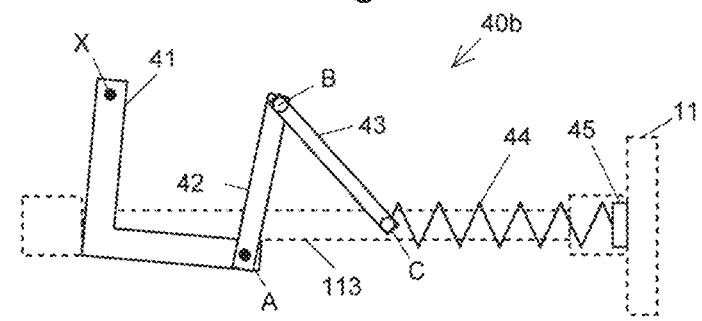

The pressing mechanism 40 can take various forms except for the form in FIG. 7A. FIGS. 7B and 7C illustrate example of the pressing mechanism.

In a pressing mechanism 40a in FIG. 7B, a plate-shaped pressing unit 45 is attached to the end of the spring 44, and the pressing unit 45 abuts on the connection unit 113a of the column 113 (a portion extending to the outside of the outer diameter of the column 113). The shape of the column 113 varies depending on the type of the column, but the column 113 is pressed by the pressing mechanism 40a in FIG. 7B so as to advance when the column 113 has a region that can be pressed by the pressing mechanism 40a.

A pressing mechanism 40b in FIG. 7C is an example that is used when the housing 30 does not include the adapter accommodating unit 311. In the pressing mechanism 40b, the pressing unit 45 attached to the end of the spring 44 is attached to a region (pressable region 11a, see FIG. 8) outside the outer diameter of the connection unit 113a of the column 113 in the flange 11 of the adapter 10. The pressing mechanism 40b presses the outside region of the flange 11 to advance the adapter 10 and the column 113.

As illustrated in FIGS. 7A to 7C, the pressing mechanism 40 (40a, 40b) can only apply the force to advance the column 113 in the axial direction, and any appropriate configuration can be adopted as long as the pressing mechanism 40 (40a, 40b) has the function. In other words, the pressing mechanism 40 may directly press the adapter 10 (the first element fixture), press the column 113 (the first element) to press the adapter 10 fixed to the column 113, or press the adapter accommodating unit 311 to press the adapter 10 accommodated in the slot 311a of the adapter accommodating unit 311 (that is, indirectly press the adapter 10). The pressing mechanism 40 described with reference to FIG. 7A is used in each of the embodiments (FIGS. 6A and 6B, FIGS. 9A to 10C, FIGS. 12 to 14C) described in the specification.

Figure 8:
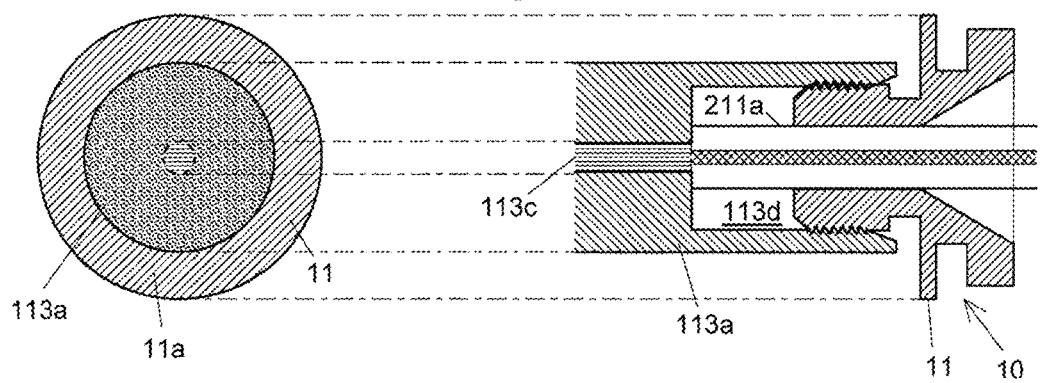
FIG. 8 is a view illustrating a state in which the column connection unit and an inlet-side piping of an EST probe are connected to the adapter of the embodiment.

FIG. 8 illustrates the configuration of the flange 11 with the column fixation section 12 attached. The left of FIG. 8 is a sectional view, and the right of FIG. 8 is a view seen from the side of the column 113. As illustrated in the left of FIG. 8, the flange 11 includes a pressable region 11a extending to the outside from the outer diameter of the connection unit 113a of the column 113. As described above, in the embodiment, the pressing mechanism 40 in FIG. 7A is used. Alternatively, the pressing mechanism 40h in FIG. 7C may be used to press the pressable region 11a. Hereinafter, advantages of the adapter 10 of the embodiment will be described when the pressing mechanism 40 in FIG. 7A or the pressing mechanism 40b in FIG. 7C is used.

Because the shape of the column 113 varies depending on the column type, sometimes the region that can be pressed by the pressing unit 45 of the pressing mechanism 40a does not exist in the connection unit 113a (that is, the pressing mechanism 40a in FIG. 7B cannot be used). On the other hand, the adapter 10 of the embodiment includes the flange 11 having the pressable region 11a, so that the pressing unit 45 (adapter accommodating unit 311) of the pressing mechanism 40 in FIG. 7A or the pressing unit 45 of the pressing mechanism 40b in FIG. 7C can abut on the pressable region 11a of the flange 11 to provide the force that advances the column 113 even in the column 113 in which the connection unit 113a does not have the region that can be pressed by the pressing mechanism 40a.

The flange 11 of the embodiment is the disk shape, but the flange 11 does not necessarily have the disk shape. The flange 11 may have another shape as long as the flange 11 has the pressable region 11a on a periphery edge (outside) of the column fixation section 12. However, when the disk-shaped flange 11 of the embodiment is used, even if the main body of the adapter 10 is rotated and accommodated in the slot 311a of the housing 30 in order to eliminate the twist of the inlet-side piping of the column 113, the flange 11 can certainly be pressed by the pressing unit 45 (adapter accommodating unit 311) of the pressing mechanism 40 in FIG. 7A or the pressing unit 45 of the pressing mechanism 40b in FIG. 7C.

For the above reasons, preferably the flange 11 has the pressable region 11a extending outside the outer shape over the entire length of the column 113 about the longitudinal axis of the column 113 as in the embodiment. Consequently, as illustrated in the left of FIG. 8, the pressable region 11a of the flange 11 can be seen from a rear (an upstream side from the outlet end of the column 113) of the column 113, the shape of the pressing unit 45 pressing the flange 11 from the rear of the column 113 can be simplified (for example, a simple plate member). The length of the inlet-side piping 211a of the ionization probe located on a downstream side of the outlet of the column 113 can be minimized because the pressing mechanisms 40, 40b can be provided behind the column 113.

As illustrated in FIG. 7A, in the pressing mechanism 40 of the embodiment, the connection point A between the arm 41 and the first connection member 42 is located below the column 113. One first coupling member 46 pierces through the arm 41 and the first connection member 42 disposed on both the sides of the column 113, and both the ends of the first coupling member 46 (see FIGS. 9A to 9C) are attached to the hole 34 made in the side surface of the housing 30. Consequently, the position of the connection point A is fixed. The second connection member 43 and the spring 44 are coupled together at the connection point C, and the second coupling member 47 (see FIGS. 9A to 9C) is attached to the long hole 35 made in the side surface of the housing 30 so as to be movable only in the axial direction. The connection point B between the first connection member 42 and the second connection member 43 moves to an appropriate position according to the operation of the arm 41, the first connection member 42, and the second connection member 43.

Figure 9A:
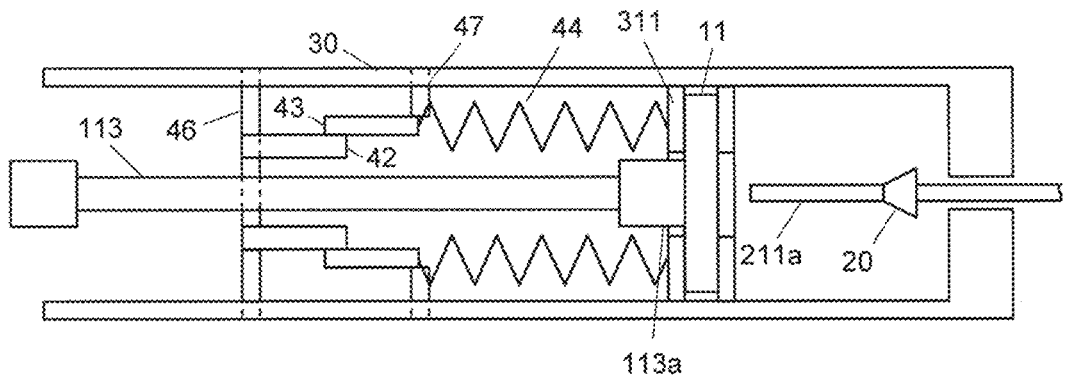
FIGS. 9A to 9C are views illustrating arrangement of components and an operation procedure of the ionization probe connection jig of the embodiment.
Figure 9B:
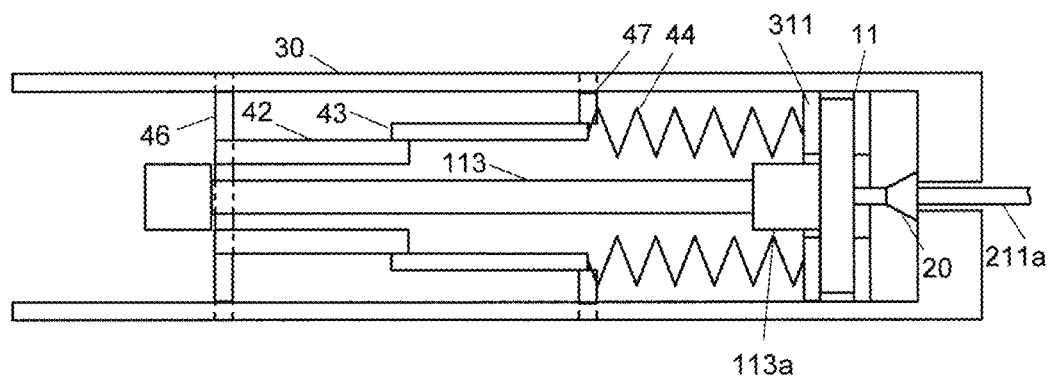
Figure 9C:
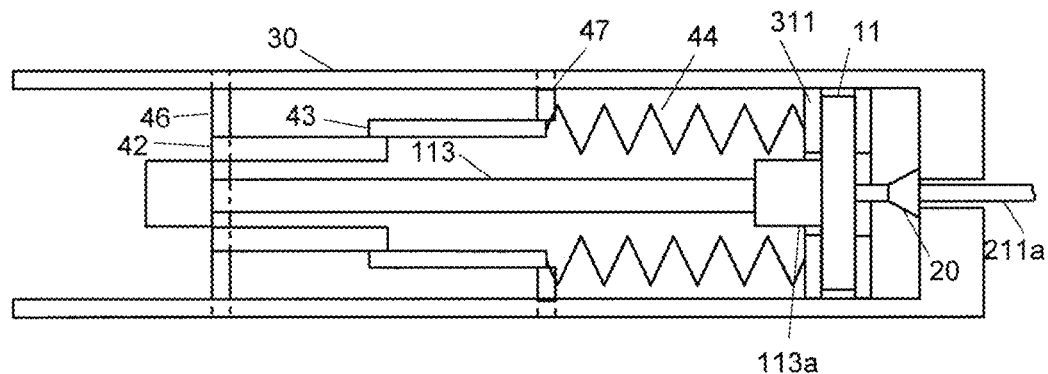
Figure 10A:
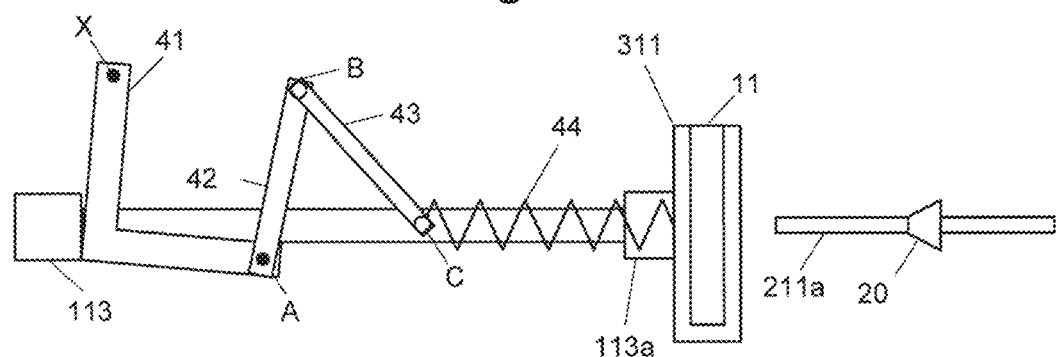
FIGS. 10A to 10C are other views illustrating the operation procedure of the ionization probe connection jig of the embodiment.
Figure 10B:
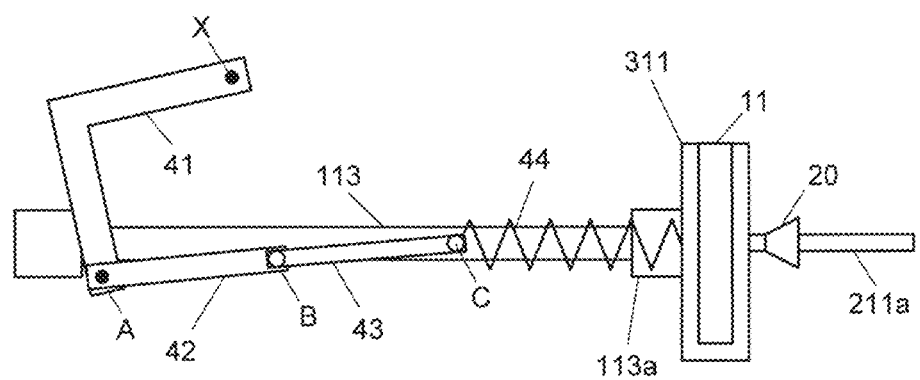
Figure 10C:
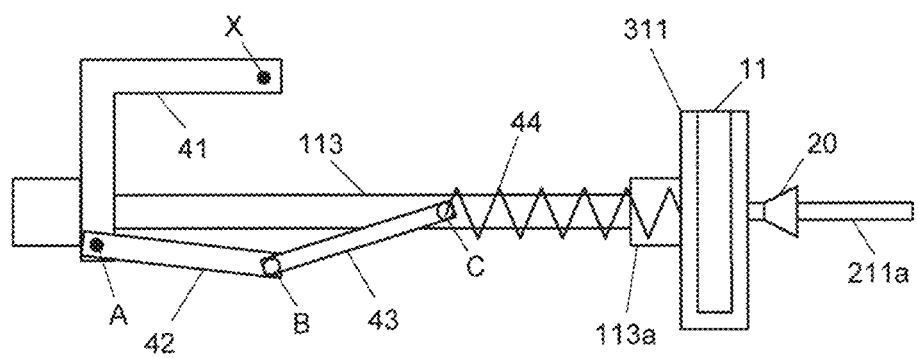
Figure 11A:
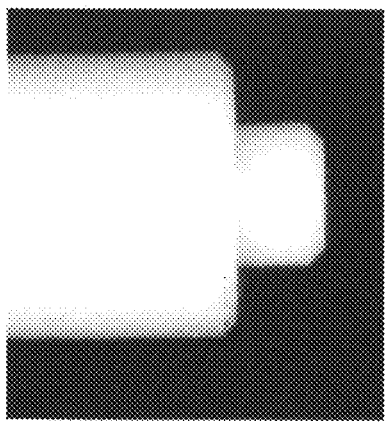
FIGS. 11A to 11D illustrate a result in which two types of ESI probes having different end shapes are used.
Figure 11B:
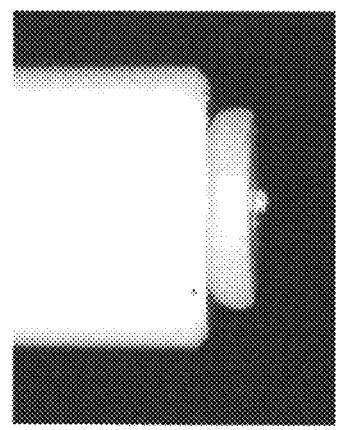
Figure 11C:
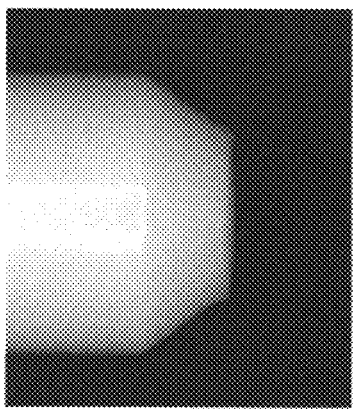
Figure 11D:
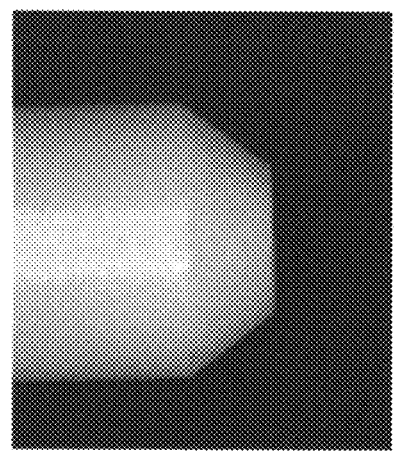

An operation procedure for connecting the inlet-side piping 211a of the ESI probe 211 to the outlet-side flow path of the column 113 using the ionization probe connection jig of the embodiment will be described with reference to FIG. 9A to FIG. 10C. FIGS. 9A to 9C are views illustrating disposition of a main part as seen from above the housing 30, and FIGS. 10A to 10C are views illustrating the disposition of the main part as seen from the side surface. The shape of the adapter 10 is as illustrated in FIGS. 4 and 6, but only the flange 11 is illustrated by simplifying the adapter 10 in FIGS. 9A to 10C. The arm 41 is omitted in FIGS. 9A to 9C in order to illustrate the position of each unit of the pressing mechanism 40 in an easy-to-understand manner.

During the use of the ionization probe connection jig of the embodiment, the connection unit 113a of the column 113 is fixed to the column fixation section 12 of the adapter 10. As described above, this is performed by screwing the thread 113b formed on the inner peripheral surface of the connection unit 113a with the thread of the column fixation section 12 of the adapter 10. The adapter 10 is held by the operation member 15, and the flange 11 of the adapter 10 is accommodated in the slot 311a of the adapter accommodating unit 311.

Subsequently, the probe fixture 20 is attached to the inlet-side piping 211a of the ESI probe 211, and the inlet-side piping 211a is placed in the ionization probe accommodating unit 33 such that the probe fixture 20 is located in the housing 30 (the inlet-side piping 211a is loosely fitted in the recess). The attaching position of the probe fixture 20 is set in consideration of the moving distance of the ESI probe 211 during an operation (to be described later) because the attaching position of the probe fixture 20 defines the retractable distance of the ESI probe 211. The disposition of each unit at this time is as illustrated in FIGS. 9A and 10A.

Subsequently, when the user operates the handle to tilt the arms 41 of the two pressing mechanisms 40, the angle formed by the first connection member 42 and the second connection member 43 gradually increases and approaches 180 degrees. As described above, the connection point A is fixed by the first coupling member 46 attached to the hole 34, and the moving direction of the connection point C is regulated only in the axial direction by the second coupling member 47 attached to the long hole 35. Thus, the spring 44 moves to the side of the flange 11, and the flange 11 moves to the side of the ESI probe 211.

In the meantime, the inlet-side piping 211a of the ESI probe 211 enters the tapered through-hole 14 of the adapter 10 and advances in the inside of the through-hole 14 little by little. The end face of the inlet-side piping 211a of the ESI probe 211 passes through the through-hole 14, and abuts on the end face of the outlet-side flow path 113c of the column 113 and the piping abutment surface 113e in the connection space 113d in the connection unit 113a of the column 113. When the arm 41 is further tilted from this state, the end face of the inlet-side piping 211a of the ESI probe 211 is pushed by the piping abutment surface 113e, and the ESI probe 211 retracts. When the ESI probe 211 retracts by a predetermined distance, the end of the probe fixture 20 comes into contact with the inner wall surface of the housing 30 to restrict the movement of the ESI probe 211. The force by which the end face of the outlet-side flow path of the column 113 pushes the end face of the inlet-side flow path of the ESI probe 211 gradually increases, and the both are connected to each other in the face abutment manner. Meanwhile, the spring 44 is gradually contracted. The disposition of each unit at this time is as illustrated in FIG. 9B and FIG. 10B.

As illustrated in FIGS. 9B and 10B, when the arm 41 is further tilted from the state in which the first connection member 42 and the second connection member 43 are located on a straight line, bending directions of the first connection member 42 and the second connection member 43 are reversed, the connection point B moves further downward, and the contracted spring 44 is restored. In the embodiment, this state (the state in FIGS. 9C and 10C) is achieved by tilting the arm 41 until one side (the side on the side to which the first connection member 42 is not connected) of the L-shaped arm 41 becomes horizontal, and the connection state between the outlet-side flow path of the column 113 and the inlet-side flow path of the ESI probe 211 is locked.

The state in FIGS. 9B and 10B is the state in which the spring 44 is contracted to the maximum, and force that restores the spring 44 works when force is applied to any member from the outside, and the connection point B easily moves upward or downward. At this point, the connection between the outlet-side flow path 113c of the column 113 and the inlet-side flow path of the ESI probe 211 is released when the connection point B moves upward to return to the direction in FIGS. 9A and 10A. In the embodiment, the arm 41 is pushed into the state in FIGS. 9C and 10C. At this point, a transition to the state in FIGS. 9B and 10B is not made unless the user operates the handle to apply the force that contracts the spring 44, and the connection state between the outlet-side flow path 113c of the column 113 and the inlet-side flow path of the ESI probe 211 are maintained.

As illustrated in FIG. 8, in the embodiment, by performing the above operation, while the outlet-side flow path 113c of the column 113 and the inlet-side piping 211a of the ESI probe 211 communicate with each other, the end faces of the flow paths are connected to each other in the face abutment manner at the piping abutment surface 113e, and a connection state in which the dead volume of the connection portion is minimized is obtained.

As described above, in the ionization probe connection jig of the embodiment, it is only necessary to fix the adapter 10 to the outlet side of the column 113 to push the flange 11 toward the ESI probe 211, and it is not necessary to screw the thread in the narrow space of the connection point of the column 113 and the ESI probe 211 unlike the conventional technique, so that the work efficiency is improved. The column 113 and the ESI probe 211 that are separately formed are used, so that only the column 113 can be removed with the disposition of the ESI probe 211 being adjusted and the ESI probe 211 being fixed. The pressing mechanism 40 is attached to the flange 11, and the handle attached to a connection point X of one of the two arms 41 is disposed outside the housing 30, so that the user can operate the handle to easily connect the outlet-side flow path 113c of the column 113 and the inlet-side flow path of the EST probe 211.

The ionization probe connection jig of the embodiment can be configured to fix the adapter 10 to the inlet side or the main body of the column 113. However, in this case, the force applied to the arm 41 is transmitted to the connection portion with the EST probe 211 through the main body of the column 113. For this reason, it is necessary to carefully apply the force during use of the column 113, such as a capillary column, which is easily damaged. Thus, preferably the adapter 10 is attached to the end (connecting unit 113a) on the outlet side of the column 113 as in the configuration described above. In this case, because the force applied to the arm 41 is transmitted to the connection portion with the ESI probe 211 with no use of the main body of the column 113, a particularly careful operation is not required even if the capillary column or the like is used.

In the ionization probe connection jig of the embodiment, the through-hole 14 is made in order to insert the inlet-side piping 211a of the EST probe 211 into the adapter 10, and the through-hole 14 is tapered. For this reason, when the inlet-side piping 211a of the ESI probe 211 is inserted, the inlet-side flow path of the ESI probe 211 is precisely aligned to the outlet-side flow path 113c of the column 113 in the through-hole 14, so that the worry about the generation of the liquid leakage is eliminated.

The ionization probe connection jig of the embodiment includes the housing 30 that accommodates each unit, and the casing of the housing 30 is accommodated in the column oven of the liquid chromatograph 100. Consequently, the concern about the vibration of the column 113 or the ESI probe 211 due to the vibration outside the liquid chromatograph mass spectrometer is eliminated, and the concern about the undesired desorption or diffusion of components in the liquid sample occurs inside the column 113 or the generation of the liquid leakage due to the release of the connection between the outlet-side flow path of the column 113 and the inlet-side flow path of the ESI probe 211 is eliminated. Each member constituting the ionization probe connection jig of the embodiment is made of a material, such as aluminum or copper, which has high thermal conductivity, which allows the temperature of the column 113 to be efficiently controlled.

In the ionization probe connection jig of the embodiment, the operation member 15 is configured to rotatably hold the disk-shaped flange 11. For this reason, after the adapter 10 is set in the adapter accommodating unit 311, the flange 11 can be rotated to eliminate the twist of the piping connected to the inlet side of the column 113. Additionally, the user can set the adapter 10 in the adapter accommodating unit 311 while taking the operation member 15, so that the user can safely and easily attach the adapter 10 without touching with the column oven or the like.

In the ionization probe connection jig of the embodiment, the pressing mechanism 40 includes the spring 44 that contracts in the axial direction. For this reason, even if the user applies the large force to the handle to apply the excessive force to the arm 41, part of the force can be absorbed by the elasticity of the spring 44 to prevent the damage of the column 113 or the inlet-side piping 211a of the ESI probe 211. The length of the piping protruding from the outlet of the column 113 (that is, the length L1, L2 of the connection space 113d in FIGS. 3A and 3B) varies depending on the type of the column 113. However, the use of the pressing mechanism 40 having the configuration including the spring 44 adjusts an entry amount of the inlet-side piping 211a of the EST probe 211 into the through-hole 14 (that is, the connection space 113d of the connection unit 113a of the column 113), so that the difference in the shape of the connection unit 113a in each column 113 can be absorbed to certainly performs the face abutment of the outlet-side end face of the column 3 and the inlet-side end face of the ESI probe 211.

The force required to apply a certain pressure (surface pressure) at the face abutment connection portion between the column 113 and the ESI probe 211 is proportional to an abutment area of the column 113 and the ESI probe 211. In the embodiment, because the end of the inlet-side piping 211a of the EST probe 211 is tapered, the area abutting on the end face on the outlet side of the column 113 is reduced, and the force required to apply the surface pressure is decreased. Thus, the spring 44 having a small spring constant can be used such that even a powerless person easily connect the outlet-side end face of the column 113 and the inlet-side end face of the EST probe 211 in the face abutment manner. Because the end of the inlet-side piping 211a of the EST probe 211 is tapered, the force applied to the arm 41 is dispersed to prevent deformation and breakage of the end of the inlet-side piping 211a of the ESI probe 211, and the durability can be increased.

FIGS. 11A to 11D illustrate the results of an experiment conducted by the inventor about the shape of the end of the inlet-side piping 211a of the ESI probe 211. When the inventor connects (uses) the ESI probe 211 (see FIG. 11A) having a step formed at the end of the inlet-side piping 211a to the column 113 in the face abutment manner, the ESI probe 211 was largely deformed even if the EST probe 211 was used once (see FIG. 11B). On the other hand, when the end of the inlet-side piping 211a was formed in the tapered shape (FIG. 11C), the inlet-side piping 211a was hardly deformed even after being used 200 times (FIG. 11D), and the durability was significantly improved. In this way, the tapered-shaped end of the piping is effective for not only as the ESI probe 211 of the embodiment, but also any case where a piping is connected to a piping having the same outer diameter as the piping or another piping having a larger outer diameter in the face abutment manner.

The above embodiment is merely an example, and a change can appropriately be made according to the spirit of the present invention.

In the above embodiment, the connection point A is located lower than the column 113. Alternatively, the connection point A can be set to the same height as that of the column 113. Hereinafter, such modifications will be described with reference to FIGS. 12 to 14C.

Figure 12:
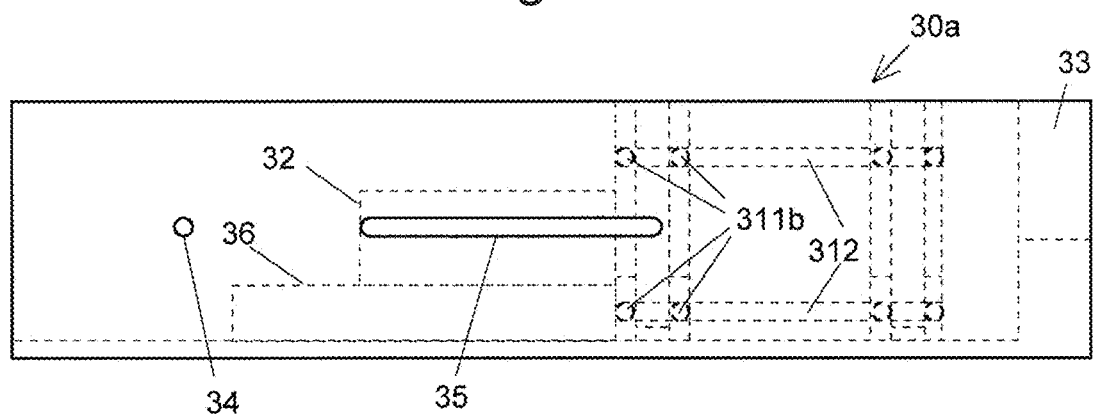
FIG. 12 is a side view illustrating a casing according to a modification.
Figure 13:
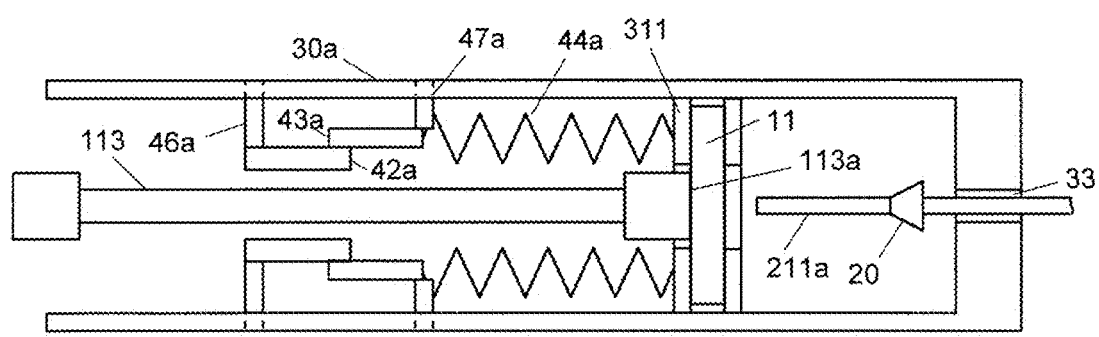
FIG. 13 is a view illustrating the arrangement of components in an ionization probe connection jig of the modification.

FIG. 12 is a view (a view corresponding to FIG. 6B) illustrating a housing 30a of the ionization probe connection jig according to the modification as seen from the side surface. FIG. 13 is a view (a view corresponding to FIG. 9A) illustrating the disposition of components of the ionization probe connection jig of the modification. In the modification, a hole 34a and a long hole 35 are made at the same height (the same height as the column).

Figure 14A:
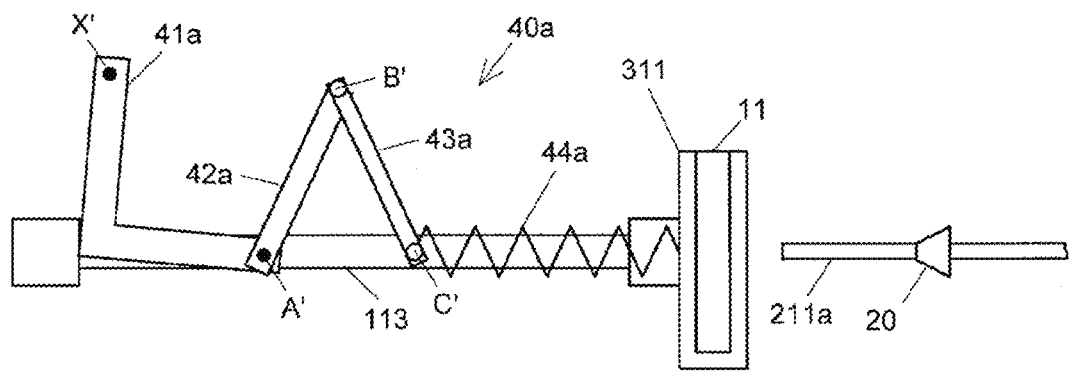
FIGS. 14A to 14C are views illustrating the operation procedure of the ionization probe connection jig of the modification.
Figure 14B:
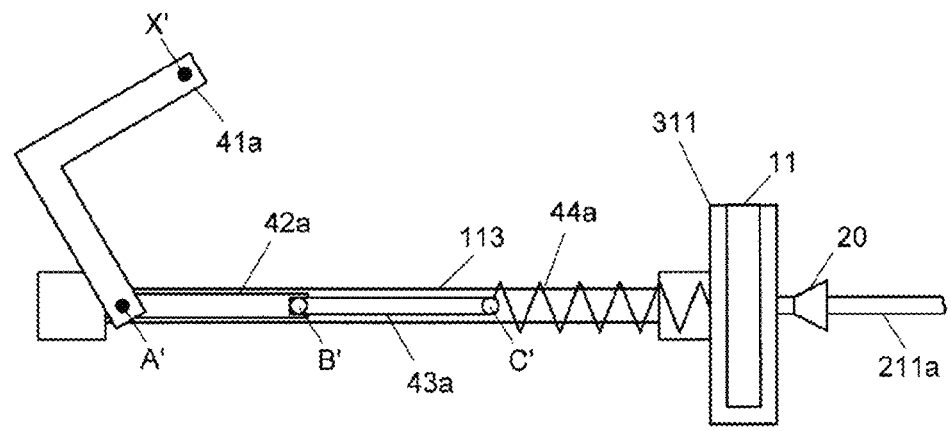
Figure 14C:
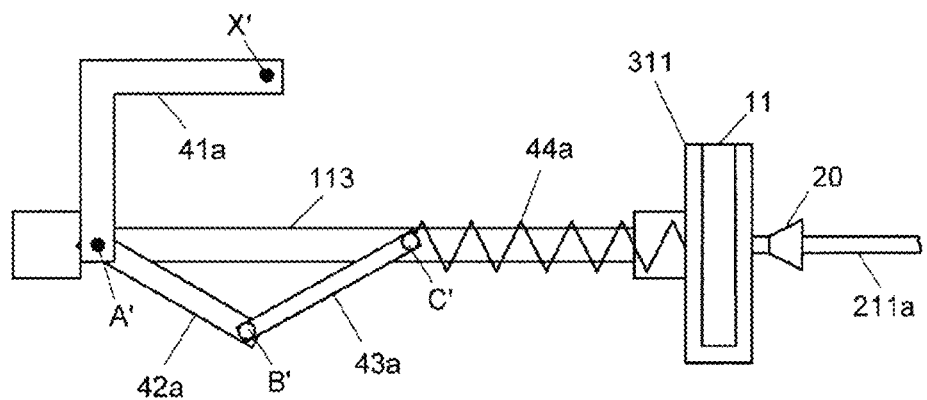

FIGS. 14A to 14C are views (a view corresponding to FIGS. 10A to 10C) illustrating operation of a pressing mechanism 40a of the modification. In the above embodiment, the connection point A is fixed at the position lower than the column 113. On the other hand, in the modification, a connection point A' is the same height as the column 113, and is fixed to a first coupling member 46a at that position. However, unlike the above embodiment, the first coupling member 46a is provided for each connection point A' between an arm 41a and a first connection member 42a (two in total), and is fixed to the hole 34a. In the above embodiment, the two arms 41 are coupled together by the first coupling member 46 at the connection point A located lower than the column 113, and the handle is provided at the end of one arm 41. In the modification, the connection point A' is located at the same height as the column 113, and the two arms 41a cannot be coupled together at this position. Therefore, in the modification, the two arms 41a are connected by a third coupling member (not illustrated) at the connection point X', and this is also used as a handle. The positions of the connection point C and a second coupling member 47a are the same as those of the above embodiment. In the modification, the operation procedure of the pressing mechanism 40a is the same as that of the above embodiment. That is, the handle is operated to tilt the arm 41a until the first connection member 42a and the second connection member 43a are located on the straight line, the outlet-side flow path of the column 113 and the inlet-side piping 211a of the ESI probe 211 are connected to each other by press-fitting, and the connection state between the outlet-side flow path of the column 113 and the inlet-side piping 211a of the ESI probe 211 is locked by further tilting the arm 41a.

In the above embodiment, the liquid chromatograph mass spectrometer is described as an example. However, the present invention can also be used in a liquid chromatograph having an ion mobility analyzer or a classifier as the detector instead of the mass spectrometer.

In the above embodiment, the ESI probe is taken as an example. However the same configuration can be adopted when another ionization probe such as an APCI probe is connected.

Figure 15:
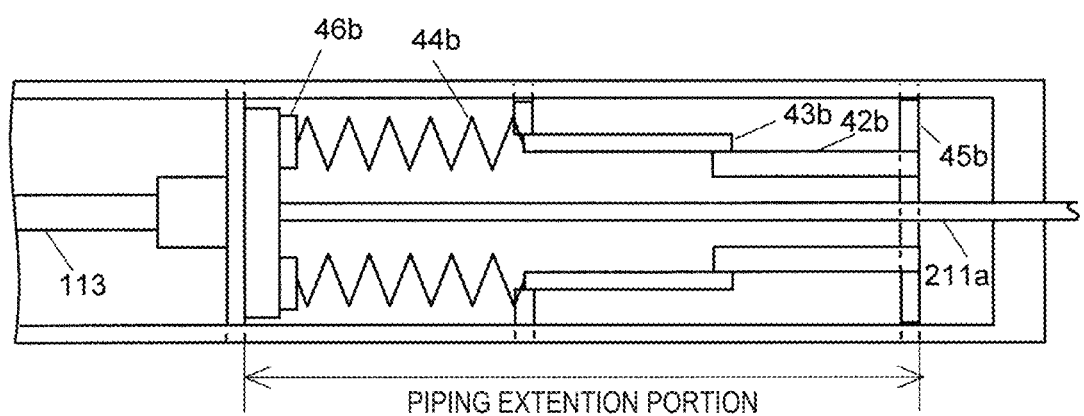
FIG. 15 is a view illustrating the arrangement of components of a pressing mechanism in an ionization probe connection jig according to another modification.

In the above embodiment, the adapter 10 is permitted to advance in the axial direction of the column 113 while the adapter 10 and the probe fixture 20 are regulated such that the flow paths of the column 113 and the ESI probe 211 are matched with each other, and the probe fixture 20 restricts the ESI probe 211 such that the EST probe 211 does not retreat beyond the predetermined position in the axial direction. Alternatively, as illustrated in FIG. 15, the ESI probe 211 may be permitted to advance in the axial direction (that is, advance in the direction toward the column 113) while the column 113 and the ESI probe 211 are regulated such that the flow paths of the column 113 and the ESI probe 211 are matched with each other, the column 113 may be restricted so as not to retreat beyond the predetermined position in the axial direction. In FIG. 15, the elements corresponding to the elements of the pressing mechanism 40 of the above embodiment are represented by the same reference numerals (42h and the like), and the reference numerals of the elements except for the column 113 and the inlet-side piping 211a of the EST probe are omitted. Even with this configuration, although the same effect as the configuration of the above embodiment can be obtained in that the outlet-side flow path of the column 113 and the inlet-side flow path of the EST probe 211 can be connected to each other without generating the dead volume, the length of the inlet-side piping 211a of the ESI probe 211 is lengthened by the length of the pressing mechanism 40 (piping extension portion in FIG. 15), and the components contained in the eluate are more easily diffused by the length of the pressing mechanism 40. Thus, the configuration of the above embodiment, namely, the configuration that permits the column 113 to advance in the axial direction of the column 113 while restricting the probe fixture 20 such that the probe fixture 20 does not retreat beyond the predetermined position in the axial direction of the EST probe 211 is more preferable. In the configuration of the above embodiment, the diffusion of components in the eluate can be suppressed to the minimum by minimizing the length of the connection portion between the outlet-side flow path of the column 113 and the inlet-side flow path of the ESI probe 211 and the piping length of the ESI probe 211.

The shapes and the number of units described in the above embodiment and modification are merely examples, and the shapes and the number of units can be changed as appropriate according to the configuration of the apparatus to be used, the usage environment, and the like.

REFERENCE SIGNS LIST

10 . . . Adapter
11 . . . Flange
11a . . . Pressable Region
12 . . . Column Fixation Section
13 . . . Probe Connection Unit
14 . . . Through-Hole
15 . . . Operation Member
151 . . . Handle
152 . . . Ring
153 . . . Protrusion
16 . . . Recess
20 . . . Probe Fixture
30, 30a . . . Housing
31 . . . Adapter Attaching Unit
311 . . . Adapter Accommodating Unit
311a . . . Slot
311b . . . Protrusion
311c . . . Recess
312 . . . Adapter Accommodating Unit Holder
32 . . . Pressing Mechanism Accommodating Unit 33 . . . Ionization Probe Accommodating Unit
36 . . . Column Mounting Unit
40, 40a, 40b . . . Pressing Mechanism
41, 41a . . . Arm
42, 42a . . . First Connection Member
43, 43a . . . Second Connection Member
44, 44a . . . Spring
45 . . . Pressing Unit
46, 46a . . . First Coupling Member
47, 47a . . . Second Coupling Member
113 . . . Column
113a . . . Connection Unit
113b . . . Thread
113c . . . Outlet-Side Flow Path
113d . . . Connection Space
113e . . . Piping Abutment Surface
211 . . . ESI Probe
211a . . . Inlet-Side Piping

The invention claimed is:

1. An ionization probe connection jig used to connect an outlet-side flow path of a column and an inlet-side flow path of an ionization probe in a liquid chromatograph, the ionization probe connection jig comprising:
 a) a first element fixture fixed to a first element that is one of the column and the ionization probe;
 b) a second element fixture fixed to a second element that is the other of the column and the ionization probe; and
 c) a movement regulating tool configured to permit the first element fixture to advance in an axial direction of the first element and to restrict the second element fixture such that the second element fixture does not retreat beyond a predetermined position in an axial direction of the second element, while regulating the first element or the first element fixture and the second element or the second element fixture such that flow paths of the first element and the second element are aligned with each other.

2. The ionization probe connection jig according to claim 1, further comprising
 d) a pressing mechanism configured to press the first element fixture so as to advance the first element fixture.

3. The ionization probe connection jig according to claim 2, wherein the pressing mechanism includes an elastic member having elasticity in the axial direction of the first element.

4. The ionization probe connection jig according to claim 1, wherein the first element is a column.

5. The ionization probe connection jig according to claim 4, wherein the first element fixture is fixed to an end on an outlet side of the column.

6. The ionization probe connection jig according to claim 5, wherein the first element fixture includes a flange including a portion larger than an outer shape about a longitudinal axis of the column.

7. The ionization probe connection jig according to claim 6, wherein the flange has a disk shape.

8. The ionization probe connection jig according to claim 5, wherein a through-hole is made at a position corresponding to a flow path of the column in the first element fixture, and the through-hole includes a tapered portion in which an inner diameter increases from a side on which the column is located toward a side on which the ionization probe is located.

9. The ionization probe connection jig according to claim 8, wherein the first element fixture is held by the liquid chromatograph so as to be rotatable about a center axis of the through-hole.

10. The ionization probe connection jig according to claim 5, wherein the first element fixture is fixed to the column by a unified screw.

11. A liquid chromatograph comprising:
 the ionization probe connection jig according to claim 4, where the first element fixture is fixed to an end on an outlet side of the column; and
 an ionization probe including an inlet side piping where an area of an end face on an inlet side is smaller than a sectional area of a portion except for the end face.

12. The liquid chromatograph according to claim 11, wherein an end on the inlet side of the inlet-side piping is tapered.

13. The ionization probe connection jig according to claim 1, wherein the first element fixture is detachably held on the liquid chromatograph.

14. The ionization probe connection jig according to claim 13, further comprising
 e) an operation member attached to the first element fixture.

15. A liquid chromatograph mass spectrometer comprising:
 a column for temporally separating components contained in a liquid sample,
 an ionization probe for ionizing components eluted from the column,
 an ionization probe connection jig used to connect an outlet-side flow path of a column and an inlet-side flow path of an ionization probe in a liquid chromatograph, the ionization probe connection jig having
  a) a first element fixture fixed to a first element that is one of the column and the ionization probe;
  b) a second element fixture fixed to a second element that is the other of the column and the ionization probe; and
  c) a movement regulating tool configured to permit the first element fixture to advance in an axial direction of the first element and to restrict the second element fixture such that the second element fixture does not retreat beyond a predetermined position in an axial direction of the second element, while regulating the first element or the first element fixture and the second element or the second element fixture such that flow paths of the first element and the second element are aligned with each other.

* * * * *